United States Patent
Park et al.

(10) Patent No.: US 7,268,833 B2
(45) Date of Patent: Sep. 11, 2007

(54) DISPLAY CONTROL METHOD

(75) Inventors: Tae Jin Park, Sungnam-si (KR); Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 10/856,772

(22) Filed: Jun. 1, 2004

(65) Prior Publication Data

US 2004/0239812 A1    Dec. 2, 2004

(30) Foreign Application Priority Data

Jun. 2, 2003    (KR)    .................. 10-2003-0035202

(51) Int. Cl.
 *H04N 5/445*    (2006.01)
(52) U.S. Cl. ................................... 348/588
(58) Field of Classification Search ........ 348/563–570, 348/732
 See application file for complete search history.

(56) References Cited

U.S. PATENT DOCUMENTS

| | | | | |
|---|---|---|---|---|
| 5,543,857 A | * | 8/1996 | Wehmeyer et al. | ......... 348/589 |
| 5,886,746 A | * | 3/1999 | Yuen et al. | .................. 348/564 |
| 5,969,769 A | * | 10/1999 | Hamadate | .................... 348/568 |
| 6,556,252 B1 | * | 4/2003 | Kim | ........................... 348/565 |
| 7,042,517 B2 | * | 5/2006 | Hirano | ........................ 348/588 |

FOREIGN PATENT DOCUMENTS

CN    1078082    11/1993

* cited by examiner

*Primary Examiner*—Paulos Natnael
(74) *Attorney, Agent, or Firm*—Birch, Stewart, Kolasch & Birch, LLP (57) ABSTRACT

A display control method includes the steps of: dividing a screen into a first display region, on which a first broadcast signal is displayed, and a second display region having a plurality of sub screens, on which a second broadcast signal is displayed, in which the second broadcast signal is received in response to a channel searching command; and controlling a position of display region on which the second broadcast signal is displayed according to the viewer's control command. Broadcast signals of channels that a viewer wants to watch can be simply searched, thus maximizing the viewer's convenience.

14 Claims, 6 Drawing Sheets

DISPLAY CONTROL METHOD

This Nonprovisional application claims priority under 35 U.S.C. § 119(a) on Patent Application No(s). 10-2003-0035202 filed in KOREA on Jun. 2, 2003, the entire contents of which are hereby incorporated by reference.

BACKGROUND OF THE INVENTION

1. Field of the Invention

The present invention relates to a display on which broadcast signal is displayed, and more particularly, to a method for controlling an image display of other channel's broadcast signal, which is displayed on a predetermined portion of a screen.

2. Description of the Related Art

Television apparatus displays broadcast signals provided from a first transmission side (for example, broadcasting station) or signals provided from a second transmission side (for example, DVD player, computer, etc.) on screen.

Such a television apparatus includes a television set with a display, a settop box, a receive card having a function of receiving a broadcast signal, etc.

Analog television apparatus that sequentially processes analog broadcast signals has been mainly produced. However, such an analog television apparatus has a drawback in that picture quality and sound quality are degraded and channel is limited.

Accordingly, digital television apparatus that processes and displays digital broadcast signals has been developed and also available commercially.

The digital television apparatus eliminates noise that is caused by other radio waves, so that a picture quality is clear. Also, since transmission of data information is possible, a variety of additional information (for example, shopping, game, banking, news, etc.) can be provided.

Meanwhile, television apparatus provides functions of picture in picture (PIP) and picture out picture (POP), which divide one screen into several small screens. In order to support the functions, at least two tuners are needed. For example, a first broadcast signal received through a first tuner is displayed on a first divided screen, a second broadcast signal received through a second tuner is displayed on a second divided screen, and a third broadcast signal received through a third tuner is displayed on a third divided screen.

Figure 1:
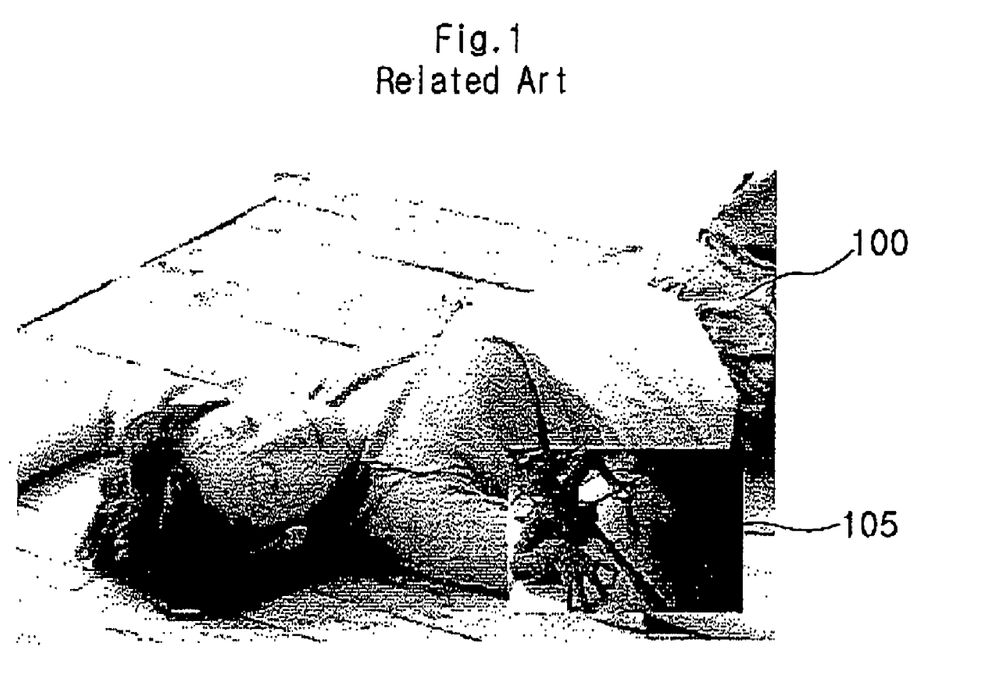
FIG. 1 is a diagram of screens that are divided according to a related art PIP function.
Figure 2A:
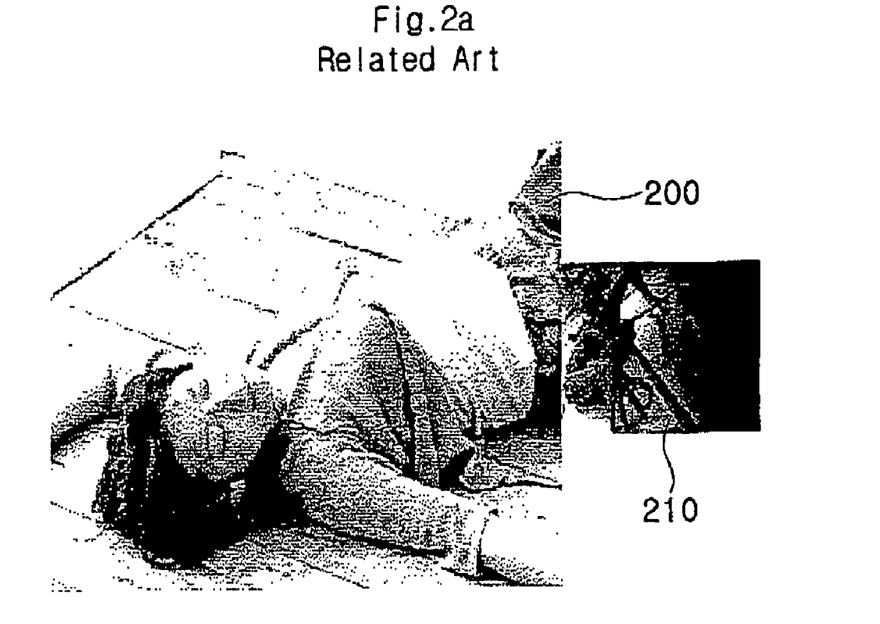
FIG. 2a is a diagram of screens that are divided according to a related art POP function.
Figure 2B:
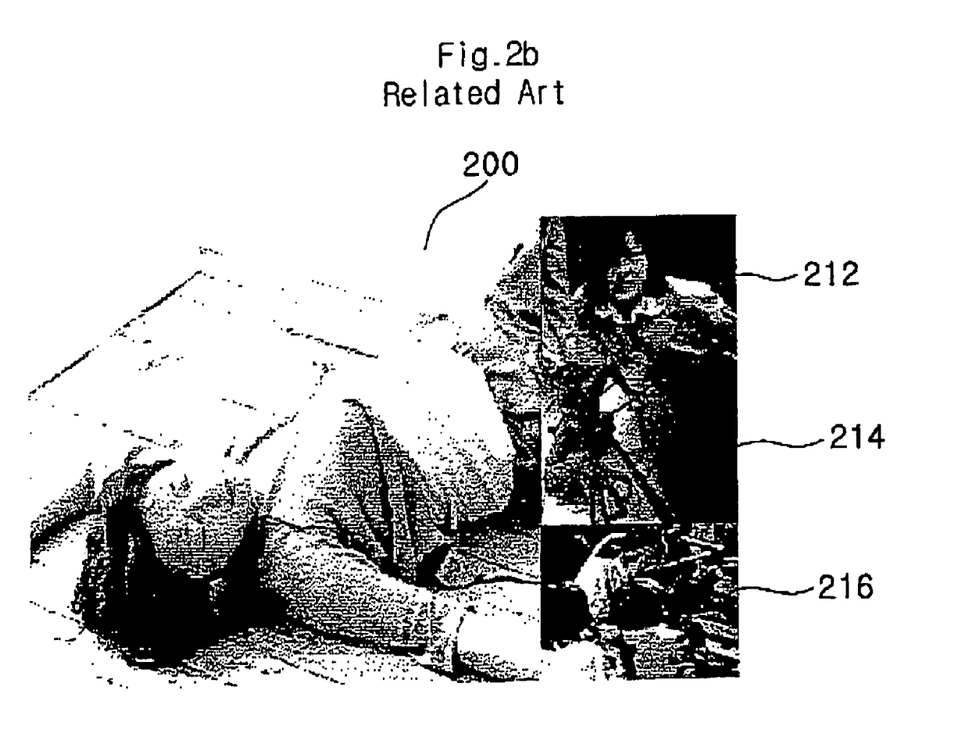
FIG. 2b is a diagram of screens that are divided according to an improved POP function.

FIG. 1 is a view of a divided screen according to a conventional PIP function. FIG. 2a is a view of a divided screen according to a conventional POP function. FIG. 2b is a view of a divided screen according to an improvement of POP function in FIG. 2a.

As shown in FIG. 1, a PIP screen includes a main screen 100 on which a main broadcast signal is displayed, and a sub screen 105 on which a sub broadcast signal is displayed. Here, the main screen 100 means a screen on which a broadcast signal a viewer now watches is displayed, and the sub screen 105 means a screen on which a broadcast signal of a channel a viewer selects through a search is displayed.

According to the PIP function, the sub screen 105 is positioned within a predetermined region of the main screen 100. Thus, the predetermined region of the main screen 100, which corresponds to the sub screen 105, is not displayed.

In the PIP screen, the sub screen 105 occupies a predetermined region of the main screen 100, so that a viewer's desire to watch the television is lowered.

In order to solve this problem, a POP function is proposed.

As shown in FIG. 2a, a POP screen includes a main screen 200 on which a main broadcast signal is displayed, and a sub screen 210 on which a sub broadcast signal is displayed. The main screen 200 occupies most of an entire region and the sub screen 210 occupies a small region, except for the region of the main screen 200.

Since the main screen 200 is not covered with the sub screen 210, a viewer's desire to watch the television is not lowered.

At this point, the sub screen 210 occupies not an entire region except for the main screen 200 but some region of the entire region except for the main screen 200.

Thus, among the entire region except for the main screen 200, a region except for the sub screen 210 exists as an empty region. An aesthetic feeling of the screen is degraded and the screen is not used efficiently owing to the empty region.

In order to solve these problems, an improved POP function is proposed. Referring to FIG. 2b, an improved POP screen is divided into a main screen 200 and a plurality of sub screens 212. Here, the sub screens 212, 214 and 216 can have the same size.

In case the POP function is applied in 16:9 wide television apparatus, it is desired that the screen be divided into three sub screens.

A main broadcast signal that a viewer is now watching is displayed on the main screen 200. Sub broadcast signals of different channels are displayed on the sub screens 212, 2147 and 216. In this manner, broadcast signals of different channels can be displayed on the main screen 200 and three sub screens 212, 214 and 216 at the same time.

In recent years, television apparatus having automatic channel searching function has been developed. Here, the automatic channel searching function means a function of tracking, selecting and displaying broadcast signals that are receivable through a tuner. For example, assuming that Ch24, Ch33, Ch38 and Ch42 are channels that are receivable through the tuner, if the television apparatus is activated to the automatic channel searching mode, Ch24, Ch33, Ch38 and Ch42 can be selected and displayed in sequence. As shown in FIG. 2b, the broadcast signals of the channels that are selected in the automatic channel searching mode can be displayed on the sub screens 212, 214 and 216. A main broadcast signal of a channel that is set as a default or is previously selected by a viewer can be displayed on the main screen 200.

According to the television apparatus having the related art POP function and automatic channel searching function, the main image and the sub images are merely displayed on the screen. Therefore, it is impossible to display the main screen and the sub screens with satisfaction to the viewer's demand. Also, a variety of viewer's searching functions cannot be satisfied within the sub screens.

SUMMARY OF THE INVENTION

Accordingly, the present invention is directed to a display control method that substantially obviates one or more problems due to limitations and disadvantages of the related art.

An object of the present invention is to provide a display control method for controlling a channel-searching broadcast signal that is displayed on a screen.

Another object of the present invention is to provide a display control method for controlling display regions of a main screen and a sub screen.

A further another object of the present invention is to provide a display control method for controlling a searching in at least two sub screens.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display control method includes the steps of: dividing a screen into a first display region, on which a first broadcast signal is displayed, and a second display region having a plurality of sub screens, on which a second broadcast signal is displayed, the second broadcast signal being received in response to a channel searching command; and controlling a position of display region on which the second broadcast signal is displayed according to the viewer's control command.

The position of display region may be controlled between the first and second display regions.

An on screen display (OSD) having direction key menus responsive to the control command may be displayed in order to control the position of display region.

The second broadcast signal displayed on one of the sub screens according to the direction key menus may be displayed on the first display region.

A moving picture may be displayed on an activated sub screen among the plurality of sub screens and a still picture may be displayed on an inactivated sub screen.

The second broadcast signal may include at least one broadcast signal that is searchable in response to the channel searching command.

The first and second display regions may be divided by one of picture in picture (PIP) mode and picture out picture (POP) mode.

In another aspect of the present invention, a method includes the steps of: dividing a screen into a first display region, on which a first broadcast signal is displayed, and a second display region having a plurality of sub screens, on which a second broadcast signal is displayed, the second broadcast signal being received in response to a channel searching command; and controlling a display order of the second broadcast signal according to a viewer's control command.

The display order may be controlled between the plurality of sub screens.

An on screen display (OSD) having direction key menus responsive to the control command may be displayed in order to control the display order.

A progressing direction of the channel searching may be changed by the direction key menus.

A previous or next broadcast signal of a progressing direction of the channel searching may be rapidly displayed by the direction key menus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
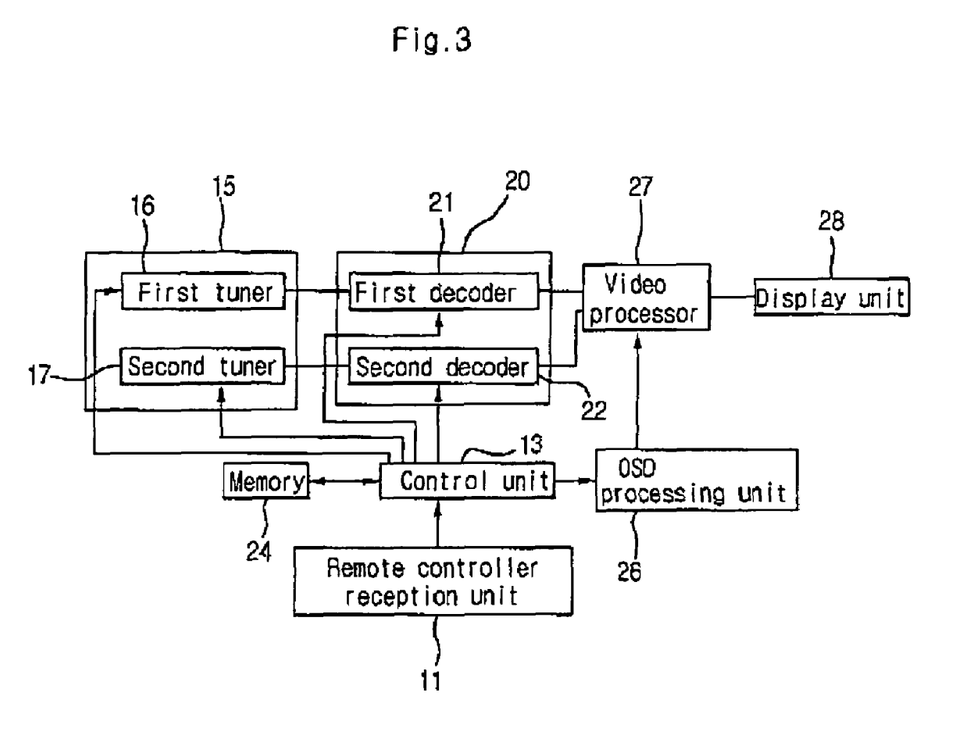
FIG. 3 is a block diagram of a display control apparatus according to a preferred embodiment of the present invention.

FIG. 3 is a block diagram of a display control apparatus according to a preferred embodiment of the present invention. The display control apparatus may be contained in the above-described television apparatus. The display control apparatus has the automatic channel searching function and the POP function. The display control apparatus can enhance a viewer's convenience by controlling broadcast signals when the broadcasting signals of channels selected by the automatic channel searching are displayed on a screen.

For the sake of convenience, elements that can be generally understood are omitted in FIG. 3.

Referring to FIG. 3, a display control apparatus according to the present invention includes a remote controller reception unit 11, a control unit 13, a tuner unit 15, a decoding unit 20, a memory 24, an on screen display (OSD) processing unit 26, a video processor 27, and a display unit 28.

The remote controller reception unit 11 receives a control signal from a remote controller (not shown). For example, a viewer can use the remote controller to turn on/off power, change a channel, or set a system. Such a remote controller includes buttons having a variety of functions. A variety of control signals are generated according to a pressing of the buttons or times of pressing.

Accordingly, the remote controller reception unit 11 is a member for receiving a variety of control signals.

The remote controller reception unit 11 provides the received control signals to the control unit 13.

The control unit 13 analyzes the control signals and provides corresponding commands to respective elements.

For example, if the control signal is a power on command, the control unit 13 drives a power source unit (not shown) to supply power to the system.

If the control signal is a channel change command, the control unit 13 provides the command to the tuner unit 15 to receive a corresponding channel.

The tuner unit 15 includes a first tuner 16 and a second tuner 17. In this embodiment, the first tuner 16 receives a broadcast signal of a channel, which is selected by the viewer. The second tuner 17 receives broadcast signals of channels, which can be received when the automatic channel searching mode is activated. Therefore, when the automatic channel searching mode is not activated, only the first tuner 16 is activated. Of course, the first tuner 16 and the second tuner 17 can be opposite to each other. In other words, the first tuner 16 may receive the broadcast signals of the available channels in the automatic channel searching mode and the second tuner 17 may receive the broadcast signal of the channel, which is selected by the viewer, The decoding unit 20 includes a first decoder 21 and a second decoder 22. The first decoder 21 is connected to the first tuner 16. The first decoder 21 decodes the broadcast signal (for example, main broadcast signal) received through the first tuner 16 and reconstructs it into an original image. The second decoder 22 is connected to the second tuner 17. The second decoder 22 decodes the broadcast signal (for example, sub broadcast signal) received through the second tuner 17 and reconstructs it into an original image.

The first and second decoders 21 and 22 are merely divided for the convenience of explanation. In the practical applications, the first and second, decoders 21 and 22 can be provided with one package.

The memory 24 includes a flash ROM and a DRAM. The flash ROM stores OS related software, automatic channel searching software, etc, and the DRAM stores virtual pictures (for example, OSD menu having direction key menu) of bitmap format, which can be displayed on the display unit 28. The OSD menu can further include image and channel information, except for the direction key menu. Here, the direction key menu contained in the OSD menu is provided for controlling broadcast signals that are displayed on the sub screen in the automatic channel searching mode. The viewer's convenience can be enhanced through the control of the direction key menu. The direction key menu may include an up direction key menu, a down direction key menu, a right direction key menu, and a left direction key menu. Each direction key menu is set to perform a specific operation. For example, the down direction key menu searches next channels more rapidly when the automatic searching progresses to next channels. Also, when the automatic searching progresses to a previous channel, the down direction key menu changes a progressing direction of the automatic searching into a next channel. The up direction key menu changes a progressing direction of the automatic searching into a previous channel. Also, when the automatic searching progresses to a previous channel, the up direction key menu searches next channels more rapidly. The left direction key menu moves the broadcast signal displayed on the sub screen to the main screen. The right direction key menu stops the automatic channel searching mode.

More detailed description about the direction key menu will be made later in detail.

Information stored in the memory 24 is executed under a control of the control unit 13 or supports the operations of other elements.

The OSD processing unit 26 processes the OSD menu, which is stored in the memory 24, to display the processed OSD menu on the display unit 28 under a control of the control unit 13.

The video processor 27 converts the format of the broadcast signal, which is decoded in the first decoder 21 and/or the second decoder 22, to be adapted to the screen. At this time, if necessary, the OSD menu provided from the OSD processing unit 26 and the decoded broadcast signal can be synthesized in the format conversion. The synthesized signal is provided to the display unit 28.

If necessary, the display, unit 28 has one screen or a plurality of screens. The display unit 28 can employ a liquid crystal display (LCD), a plasma display panel (PDP), a cathode ray tube (CRT), and the like.

For example, in case the broadcast signal of the channel selected by the viewer is received through the first tuner 16 and is displayed on the display unit 28, the display unit 28 can be comprised of the one screen. The selected broadcast signal can be displayed on the one screen.

On the other hand, in case the viewer activates the automatic channel searching mode, the second tuner 17 receives broadcast signals of different receivable channels at predetermined intervals and displays the received broadcast signals on the display unit 28. In this case, the POP mode is activated to divide the screen of the display unit 28 into a plurality of sub screens. In other words, the screen of the display unit 28 includes a main screen for displaying the broadcast signal received through the first tuner 16 over a channel selected by the viewer, and the plurality of sub screens for displaying the broadcast signals, which are received through the second tuner 17 of the receivable channels. At this time, the broadcast signal provided from the second tuner 17 is displayed on only one of the sub screens. As described above, in case the broadcast signal provided from the second tuner 17 is now displayed on one sub screen, a previous broadcast signal is displayed as a still picture on other sub screens. In this case, the broadcast signal provided from the second tuner 17 is displayed on the one sub screen as the moving picture. Here, the sub screen on which the moving picture is displayed is referred to as an "active sub screen". The direction key menu is displayed together at a predetermined position of the sub screen on which the moving picture is displayed. That is, the direction key menu is displayed only on the sub screen on which the moving picture is being displayed.

In this case, the viewer can use a remote controller to control the direction key menu displayed on the sub screen, on which the moving picture is displayed. As described above, the direction key menu can include an up direction key, a down direction key, a left direction key, and a right direction key. Each direction key menu is set to perform a specific operation. The down direction key menu displays a broadcast signal of a next channel, and the up direction key menu displays a broadcast signal of a previous channel. The left direction key menu moves a broadcast signal displayed on the sub screen to the main screen, and the right direction key menu stops the automatic channel searching mode. Each function of the direction key menus can be exchanged.

The remote controller can include buttons corresponding to the direction key menus displayed on the sub screen.

Accordingly, the corresponding operations of the direction key menus can be performed by manipulating the buttons of the remote controller. The operation method will be described in detail.

Figure 4:
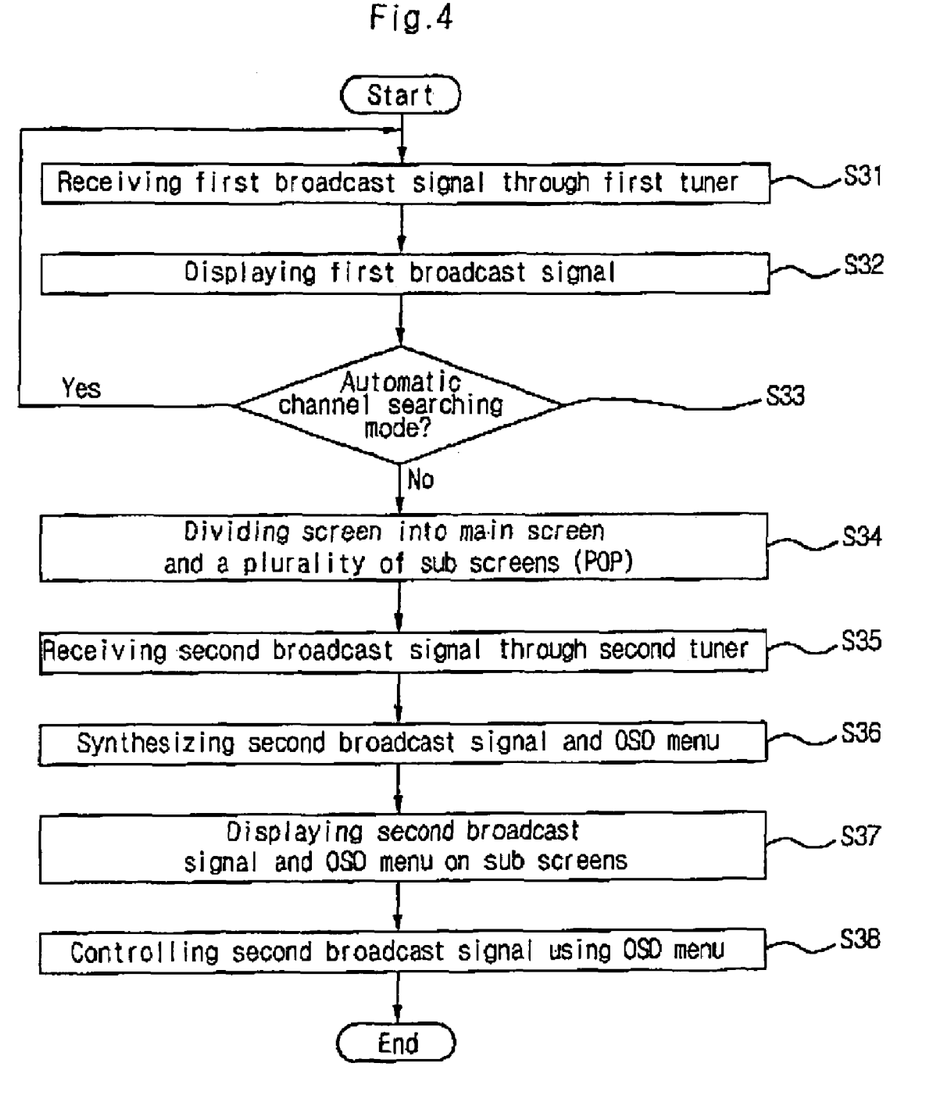
FIG. 4 is a flowchart illustrating a method for controlling a broadcast signal for a display channel searching according to a preferred embodiment of the present invention.

FIG. 4 is a flowchart illustrating a method for controlling a broadcast signal for a display channel searching according to a preferred embodiment of the present invention.

Referring to FIGS. 3 and 4, the first tuner 16 receives a first broadcast signal of a first channel, which will be provided to the main screen (S31). That is, when the power is on, the first tuner 16 receives a broadcast signal of a channel, which is set as a default or selected through the remote controller by the viewer.

The received first broadcast signal is a broadcast signal that the viewer wants to view now. The received first broadcast signal is displayed on the main screen when the POP function or PIP function is performed (S32). That is, the first broadcast signal is decoded by the first decoder 21, format-converted by the video processor 27, and displayed on the main screen of the display unit 28.

Accordingly, the viewer can view the first broadcast signal displayed on the main screen of the display unit 28.

The POP mode or PIP mode can be activated or not. If the POP mode or PIP mode is not activated, the entire screen of the display unit 28 can function as the main screen. If the POP mode or PIP mode is activated, the screen of the display unit 28 is divided into the main screen and the plurality of sub screens.

At any rate, the first broadcast signal of the first channel is displayed on the main screen without regard to the activation of the POP mode or PIP mode.

If the viewer selects the automatic channel searching using the remote controller in order to check the broadcast signals of other channels, the apparatus is activated to the automatic channel searching mode. In other words, the control unit 13 checks whether or not the control signal received from the remote controller is the automatic channel searching mode (S33).

In case the received control signal is the automatic channel search mode, the second tuner 17 is activated to the automatic channel searching mode. Furthers the POP mode or PIP mode is activated to divide the screen of the display unit 28 into the main screen and the plurality of sub screens (S34).

Accordingly, the second tuner 17 receives a second broadcast signal of a second channel (S35).

In the automatic channel searching mode, the second tuner 17 sequentially receives the receivable channels at predetermined intervals. The received channels are sequentially displayed on the sub screens of the display unit 28. For example, in case the receivable channels are Ch24, Ch33, Ch38 and Ch 42, the second tuner 17 first receives a broadcast signal of the channel Ch24, and then receives broadcast signals of the channels Ch33, Ch38 and Ch42 in sequence at predetermined intervals.

When the automatic channel searching mode is activated to receive the second broadcast signal of the second channel through the second tuner 17, the control unit 13 provides the OSD menu including the direction key menus stored in the memory 24 to the OSD processing unit 26. The OSD processing unit 26 processes the OSD menu for the screen display and provides the processed OSD menu to the video processor 27. As described above, the direction key menus include the down direction key menu, the up direction key menu, the left direction key menu and the right direction key menu.

The video processor 27 synthesizes the second broadcast signal of the second channel and the OSD menu so that the second broadcast signal and the OSD menu can be displayed on one screen (S36).

The second broadcast signal and the OSD menu, which are synthesized at the video processor 27, are displayed on one sub screen (that is, an active sub screen) among the plurality of sub screens (S37). Here, the active sub screen means the sub screen on which the second broadcast signal is being displayed as the moving picture. Accordingly, the previously displayed second broadcast signals of the second channel are displayed as the still picture on the remaining sub screens.

Accordingly, the moving picture is displayed on the sub screen on which the second broadcast signal is displayed, and the still picture is displayed on the remaining sub screens.

At this time, the first broadcast signal of the first channel received through the first tuner 16 is displayed on the main screen of the display unit 28.

As described above, if the automatic, channel search mode is activated, the receivable channels are received through the second tuner 17 at predetermined intervals and are sequentially displayed on,the sub screens of the display unit 28.

Figure 6:
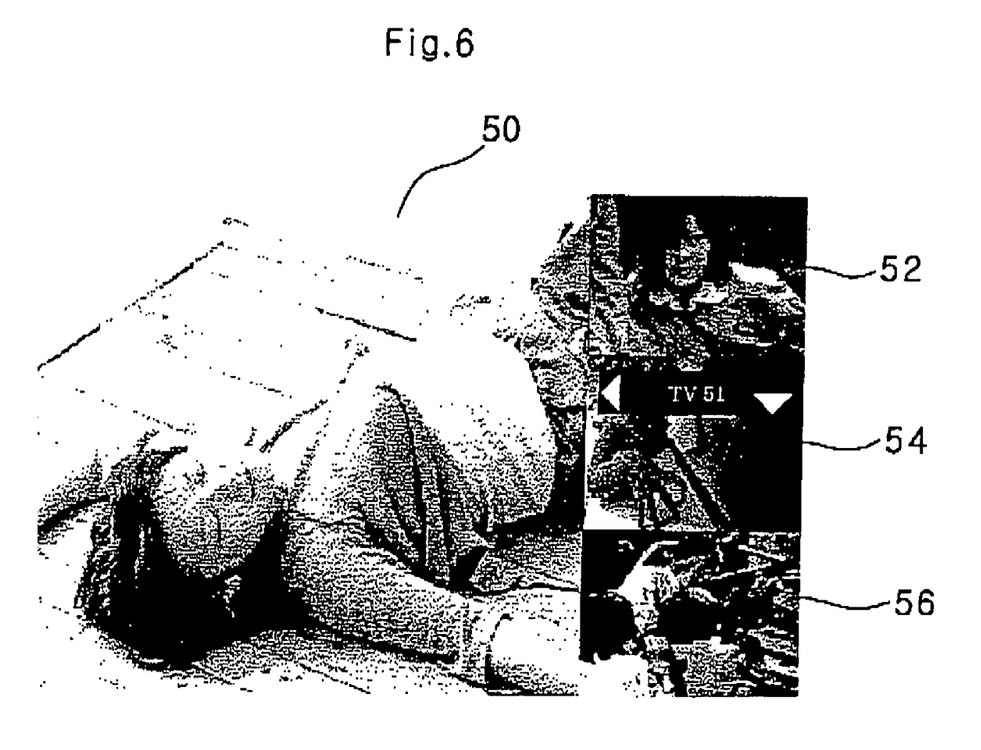
FIG. 6 is a diagram illustrating broadcasting signals that are displayed on a screen according to a preferred embodiment of the present invention.

As shown in FIG. 6, the screen of the display unit 28 is divided into one main screen 50 and three sub screens 52, 54 and 56. The broadcast signal of the first channel received through the first tuner 16 is displayed as the moving picture on the main screen 50. If the automatic channel searching mode is activated, the broadcast signals of the channels received through the second tuner 17 are sequentially displayed on the sub screens 52; 54 and 56 at predetermined intervals.

For example, the broadcast signal of one channel initially received through the second tuner 17 is displayed as the moving picture on the first sub screen 52. Then, the broadcast signals of other channels received through the second tuner 17 are sequentially displayed as the moving pictures on the second and third sub screens 54 and 56 at predetermined intervals. If a broadcast signal of a further another channel is received, the received broadcast signal is again displayed as the moving picture on the first sub screen 52.

Here, when the broadcast signals of different channels are displayed as the moving picture on a next sub screen (for example, the second sub screen 54), the broadcast signal displayed as the moving picture on a previous sub screen (for example, the first sub screen 52) is displayed as the still picture. That is, a last scene of the broadcast signal displayed as the moving picture is displayed as the still picture on the first sub screen 52.

The above procedures are continuously performed during the activation of the automatic channel searching mode.

As described above, the second broadcast signal of the second channel and the OSD menu are displayed on one of the sub screens.

At this time, the OSD menu can be used to control the broadcast signals displayed on the sub screens. The remote controller includes the direction key buttons corresponding to the down direction key menu, the up direction key menu, the left direction key menu, and the right direction key menu, which are contained in the OSD menu. The viewer manipulates the buttons of the remote controller to operate a corresponding direction key menu of the OSD menu such that the operation corresponding to the direction key menu is performed. At this time, each of the direction key menus is set to perform the above operations.

In other words, the down direction key menu searches next channels more rapidly when the automatic searching progresses to next channels. Also, when the automatic searching progresses to a previous channel, the down direction key menu changes a progressing direction of the automatic searching into a next channel. The up direction key menu changes a progressing direction of the automatic searching into a previous channel. Also, when the automatic searching progresses to a previous channel, the up direction key menu searches next channels more rapidly. The left direction key menu moves the broadcast signal displayed on the sub screen to the main screen. The right direction key menu stops the automatic channel searching mode.

A detailed description about them will be made in detail with reference to FIG. 5.

Figure 5:
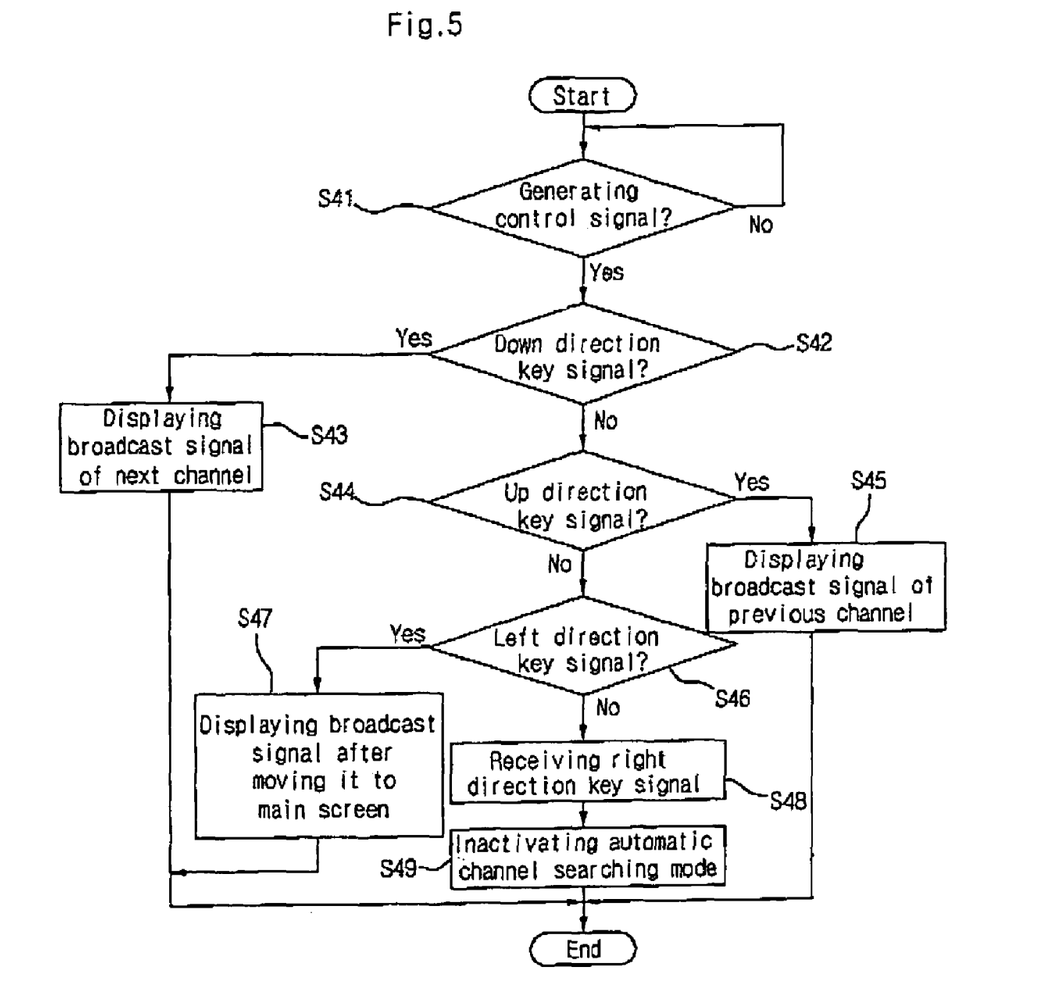
FIG. 5 is a flowchart illustrating a method for controlling the second broadcasting signal in FIG. 4.

FIG. 5 is a flowchart illustrating a method for controlling the second broadcast signal of FIG. 4.

Referring to FIGS. 3 and 5, when the viewer presses a specific button of the remote controller, a control signal corresponding to the specific button is generated (S41).

The control unit 13 checks the control signal. In other words, the control unit 13 checks whether the control signal is the down direction key signal (S42).

If the control signal is the down direction key signal, the control unit 13 controls the OSD processing unit 26 to perform an operation of pressing the down direction key menu of the OSD menu displayed on the sub screen of the display unit 28 and also performs an operation corresponding to the down direction key menu. At this time, the operation corresponding to the down direction key menu can be performed as one of two cases according to the progressing direction of the automatic searching. In case the automatic searching progresses to next channel, the down direction key menu displays the broadcast signal of the next channel more rapidly. Accordingly, the broadcast signal of the next channel is received through the second tuner 17 more rapidly and is displayed. Of course, even if the down direction key menu does not operate due to the automatic searching function, the next channels can be searched at predetermined time intervals. However, the next channels can be searched more rapidly by operating the down direction key menu.

In case the automatic searching progresses to the previous channel, the down direction key menu changes the progressing direction of the automatic searching into the next channel.

The broadcast signal of the next channel is displayed as the moving picture on the next sub screen of the display unit 28 (S43). For example, as shown in FIG. 6, in case a broadcast signal of a current channel is displayed on the second sub screen 54, the received broadcast signal of the next channel can be displayed as the moving picture on the third sub screen 56.

If the viewer presses the down direction key button again, the second tuner 17 receives a broadcast signal of a next channel. The received broadcast signal of the next channel is displayed as the moving picture on the first sub screen 52 of the display unit 28. Accordingly, if the viewer repeatedly presses the down direction key button, the broadcast signals of next channels may be displayed on the sub screens in order of the third sub screen 56, the first sub screen 52 and the second sub screen 54.

In this case, the OSD menu is preferably displayed on the sub screen on which the broadcast signal of the next channel is displayed.

In this manner, the viewer can again check the broadcast signals of the previously searched next channels using the down direction key menu.

If the control signal is not the down direction key signal, the control unit 13 checks whether the control signal is the up direction key signal (S44).

If the control signal is the up direction key signal, the control unit 13 controls the OSD processing unit 26 to perform an operation of pressing the up direction key menu of the OSD menu displayed on the sub screen of the display unit 28. Meanwhile, the control unit performs an operation corresponding to the up direction key menu. At this time, the operation corresponding to the up direction key menu can be performed as one of two cases according to the progressing direction of the automatic searching. In case the automatic searching progresses to the previous channel, the up direction key menu displays the broadcast signal of the previous channel more rapidly. Accordingly, the broadcast signal of the previous channel is received through the second tuner 17 more rapidly and is displayed. Of course, even if the up direction key menu does not operate due to the automatic searching function, the previous channels can be searched at predetermined time intervals. However, the previous channels can be searched more rapidly by operating the up direction key menu.

In case the automatic searching progresses to the next channel, the up direction, key menu changes the progressing direction of the automatic searching into the previous channel.

The broadcast signal of the previous channel is displayed as the moving picture on the previous sub screen of the display unit 28 (S45). For example, as shown in FIG. 6, in case a broadcast signal of a current channel is displayed on the second sub screen 54, the received broadcast signal of the previous channel can be displayed as the moving picture on the first sub screen 52.

If the viewer presses the up direction key button again, the second tuner 17, receives the broadcast signal of the previous channel. The received broadcast signal of the previous channel is displayed as the moving picture on the third sub screen 56 of the display unit 28. Accordingly, if the viewer repeatedly presses the up direction key button, the broadcast signals of previous channels may be displayed on the sub screens in order of the first sub screen 52, the third sub screen 56 and the second sub screen 54, In this case, the OSD menu is preferably displayed on the sub screen on which the broadcast signal of the previous channel is displayed.

In this manner, the viewer can again check the broadcast signals of the searched previous channels using the up direction key menu.

If the control signal is not the up direction key signal, the control unit 13 checks whether the control signal is the left direction key signal (S46).

If the control signal is the left direction key signal, the control unit 13 controls the OSD processing unit 26 to perform an operation of pressing the left direction key menu of the OSD menu displayed on the sub screen of the display unit 28. Meanwhile, the control unit 13 moves the broadcast signal displayed as the moving picture on the sub screen to the main screen, such that the broadcast signal can be displayed on the main screen (S47). For this purpose, the control unit 13 controls to receive the broadcast signal displayed on the sub screen, not the broadcast signal displayed on the main screen, through the first tuner 16. At this time, the current moving picture is displayed on the sub screen.

Accordingly, the viewer can select the broadcast signal of the channel searched and displayed on the sub screen and displays the broadcast signal on the main screen.

The viewer needs to stop the automatic channel searching mode sometimes.

For this purpose, the viewer presses the right direction key button of the remote controller, thus generating the right direction key signal.

The remote controller reception unit 11 receives the right direction key signal generated from the remote controller (S48).

Accordingly, the control unit 13 controls the OSD processing unit 26 to perform an operation of pressing the right direction key menu of the OSD menu displayed on the sub screen of the display unit 28 and also inactivates the activated automatic channel searching mode (S49). In other words, the moving pictures are continuously displayed on the sub screen on which the current moving picture is being displayed. The automatic searching to the next or previous channel is not performed any more.

At this time, the viewer can again activate the automatic channel searching mode using the up or down direction key button of the remote controller. In other words, if the up or down direction key signal is received, the control unit 13 activates the automatic channel searching mode. For this purpose, the control unit 13 again activates the second tuner 17 to receive broadcast signals of the receivable channels. At this time, the second tuner 17 receives a broadcast signal of a next channel or previous channel of the broadcast signal displayed as a still picture on a sub screen at a time point when the automatic channel searching mode is inactivated.

According to the present invention, the broadcast signal of the previous or next channel is searched by selecting the direction key menus from the OSD menu containing the direction key information on the sub screens. Also, the broadcast signal displayed on the sub screen can be displayed on the main screen. Further, the automatic searching mode can be paused and restarted.

As described above, according to the present invention, the broadcast signals displayed on the sub screens are simply controlled using the direction key information contained in the OSD menu, thus maximizing the viewer's convenience by searching the broadcasting that the viewer wants to watch.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display control method comprising:
    dividing a screen into a first display region, on which a first broadcast signal is displayed, and a second display region having a plurality of sub screens, on which a second broadcast signal is displayed, the second broadcast signal being received in response to a channel searching command; and
    controlling a position of a display region on which the second broadcast signal is displayed according to a user's control command,
    wherein the first display region is not overlapped with the second display region,
    wherein a moving picture is displayed on an activated sub screen among the plurality of sub screens and a still picture is displayed on an inactivated sub screen when the user selects an automatic channel mode, and
    wherein an on screen display (OSD) having direction key menus responsive to the control command is displayed in order to control the position of the display region which is located in the second display region.

2. The display control method according to claim 1, wherein the position of the display region is controlled between the first and second display regions.

3. The display control method according to claim 1, wherein the second broadcast signal includes at least one broadcast signal that is searchable in response to the channel searching command.

4. The display control method according to claim 1, wherein the first and second display regions are divided by one of picture in picture (PIP) mode and picture out picture (POP) mode.

5. The display control method according to claim 1, wherein the on screen display (OSD) having the direction key menus is displayed on the activated sub screen.

6. The display control method according to claim 5, wherein the control of the position of the display region is performed using the direction key menus of the OSD displayed on the activated sub screen.

7. A display control method comprising:
    dividing a screen into a first display region, on which a first broadcast signal is displayed, and a second display region having a plurality of sub screens, on which a second broadcast signal is displayed, the second broadcast signal being received in response to a channel searching command; and
    controlling a display order of the second broadcast signal according to a user's control command,
    wherein the first display region is not overlapped with the second display region,
    wherein a moving picture is displayed on an activated sub screen among the plurality of sub screens and a still picture is displayed on an inactivated sub screen when the user selects an automatic channel mode, and
    wherein an on screen display (OSD) having direction key menus responsive to the control command is displayed in order to control a position of a display region on which the second broadcast signal is displayed, which is located in the second display region.

8. The display control method according to claim 7, wherein the display order is controlled between the plurality of sub screens.

9. The display control method according to claim 8, wherein the display order is controlled by a channel order of the plurality of sub screens.

10. The display control method according to claim 7, wherein a progressing direction of the channel searching is changed by the direction key menus.

11. The display control method according to claim 7, wherein a previous or next broadcast signal of a progressing direction of the channel searching is rapidly displayed by the direction key menus.

12. The display control method according to claim 7, wherein the second broadcast signal includes at least one broadcast signal that is searchable in response to the channel searching command.

13. The display control method according to claim 7, wherein the first and second display regions are divided by one of picture in picture (PIP) mode and picture out picture (POP) mode.

14. The display control method according to claim 7, wherein the on screen display (OSD) having the direction key menus is displayed on the activated sub screen.

* * * * *